Sept. 11, 1962 E. L. ECKFELDT ET AL 3,054,047

CONDUCTIVITY CELLS

Filed April 7, 1959 2 Sheets-Sheet 2

3,054,047

CONDUCTIVITY CELLS

Edgar L. Eckfeldt, Ambler, and Eugene R. Kuczynski, Philadelphia, Pa., assignors to Leeds and Northrup Company, Philadelphia, Pa., a corporation of Pennsylvania Filed Apr. 7, 1959, Ser. No. 804,765
21 Claims. (Cl. 324—30)

This invention relates to conductivity cells and has for an object the provision of structure for making the cells reliable in operation with a predetermined cell-constant, such cells being useful for reproducible determination of the conductivity of liquids of widely differing character.

The present application is a continuation-in-part of our application, Serial No. 569,066, filed March 2, 1956, now Patent No. 2,888,640. In our said parent application we disclosed a conductivity cell comprising a molded body with a pair of conductors embedded in the body. The conductors extend outwardly from one end of the molded body to provide for electrical connection between electrodes intended to contact a liquid and a measuring circuit. The conductivity cells of our aforesaid application had cell constants respectively of 25 reciprocal centimeters and 50 reciprocal centimeters. While other and different cell constants may be obtained in accordance with the design of our said parent application by suitably changing the diameter and length of the flow passages, there arise additional considerations disadvantageous when dimensions alone are changed in our aforesaid cell, particularly when the cell constant is to be reduced to a much lower order, for example to 1 reciprocal centimeter. Nevertheless, the associated measuring equipment and the associated piping needed for flow of liquid through the cell will be substantially the same for conductivity cells of widely differing cell constants, as for example from 0.002 reciprocal centimeter to 50 reciprocal centimeters. Accordingly, it is highly advantageous that the conductivity cell of the present invention, insofar as the electrical circuits and attachment to other structural members are concerned, be interchangeable with conductivity cells having other and different cell constants.

In order to achieve reproducibility in conductivity measurements with a cell constant of a very low order, as for example in the range of from 0.002 to about 0.01 reciprocal centimeter, the conductivity cell of the present invention is characterized by the provision of multiple turn electrodes rigidly mounted in bifilar relation one to the other, with the adjacent turns of the two electrodes in closely fixed predetermined parallel relationship. As a result of this characterizing feature of the present invention, a surprisingly high degree of uniformity of measurement is attained since with the described structure there has been minimized the effect upon the measurement of slight variations in dimensions which inescapably arise during course of manufacture.

For further objects and advantages of the invention and for detailed instructions as to how to produce electrodes embodying the invention, reference is to be had to the following detailed description taken in conjunction with the accompanying drawings, in which.

Figure 1:
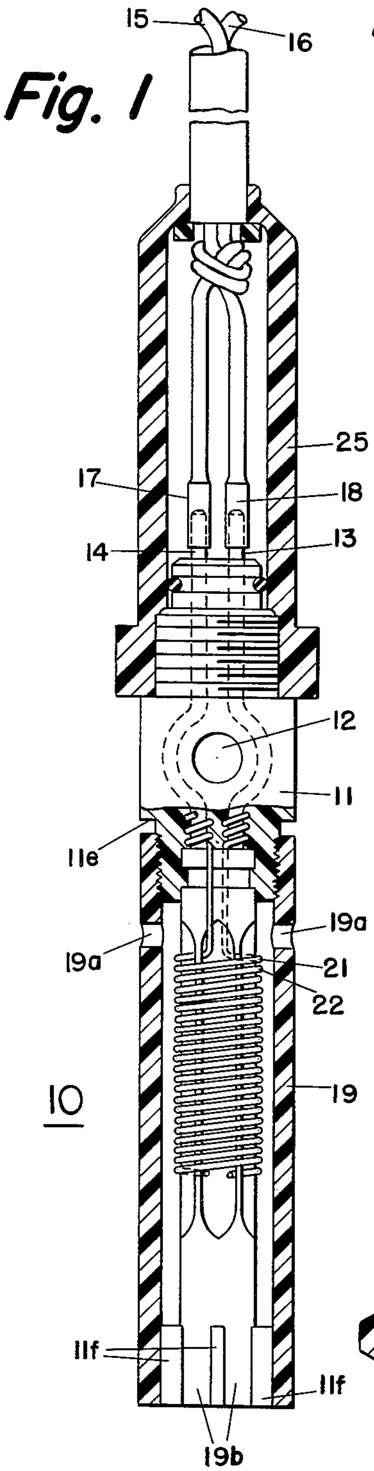
FIG. 1 is a sectional view of a conductivity cell embodying the invention.

Referring to FIG. 1, the conductivity cell 10 includes a molded body 11 having a transverse passage 12 extending through the upper end thereof. A pair of conductors 13 and 14, preferably of silver plated copper, protrudes outwardly from the upper end of the body 11 to form pin-like connectors for the measuring circuit to be used in conjunction with the cell 10. The conductors 15 and 16 from that measuring circuit are illustrated. They are shown connected to the conductors 13 and 14 by clips 17 and 18. The measuring portion of the cell 10 is formed by the lower end portion of molded body 11 and embraces the region within a protective cover or housing 19 occupied by spaced, conductivity electrodes formed by bifilar wound bare conductors 21 and 22. By bifilar wound conductors, we mean that the two conductors are wound in parallel relation so that the resistance measurement takes place between a multiplicity of opposed electrode surfaces, all effectively in parallel one to the other. Thus, for example, there will be a measurement of electrical resistance of the liquid disposed between turn *a* of conductor 21, FIG. 4, and turn *b* of conductor 22. There will be a like measurement of the resistance between turn *b* of conductor 22 and turn *c* of conductor 21, and so on.

More particularly, the two electrodes 21 and 22 provide resistance or conductance measurements between substantially parallel helical paths of considerable length. The electrodes have the same, or substantially the same, pitch diameter. It is in this manner that there is achieved reproducibility of precise measurements of conductivity of liquids with a desired low value for the cell constant. The pitch, which determines spacing, determines in part the cell-constant desired. The pitch or spacing is maintained with high uniformity throughout the length of the electrode by the provision of helically disposed sets of grooves 21*g* and 22*g* which, though of intermittent character, equally space the turns of each helix and the rigid mounting which they afford precisely predetermines the spacing between the adjacent turns of the two electrodes. It is to be noted that while the portion 11*a* with an even number of alternate flutes and ribs is shown and has certain advantages, an odd number may be used or if desired, a mandrel without ribs and flutes may be used. At the lower end of the conductivity cell the respective ends of the helical electrodes 21 and 22 project through openings through ribs and are there provided with enlarged ends 21*a* and 22*a*, FIG. 5, to anchor in place the lower ends of the two electrodes. The upper ends of the two electrodes 21 and 22 are suitably secured to the conductors 13 and 14. They can be wound about conductors 13 and 14 and welded, soldered or brazed thereto to form a low-resistance electrical connection therewith.

For a cell constant of 0.01 reciprocal centimeter there will be provided from the fluted region of the extension 11*a* of core 11, 12⅙ turns of platinum or platinum coated wire, B. & S. No. 22, twenty-five thousandth inch diameter. For a cell constant of 0.002 there will be utilized 30⅔ turns per electrode of platinum or platinum coated wire which may also be B. & S. No. 22, flattened to a strip 0.010 inch by 0.046 inch.

The protective tubular housing 19 is preferably provided with openings or flow channels 19*a*, and the lower end of the extension 11*a* is provided with centering fins 11*f* to maintain proper spacing with respect to housing 19, the spaces 19*b* between the fins providing ease of access of liquid into the interior of the cell proper. The electrodes 21 and 22 are located intermediate said openings 19*a* and 19*b* and in spaced relation therewith.

Figure 2:
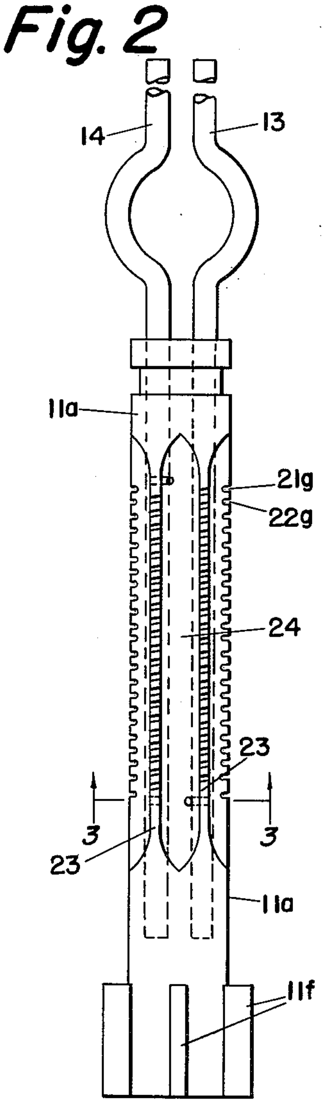
FIG. 2 is an elevation illustrating the completion of the first molding operation.

Though some of the features of the present cell are similar to those of our parent case, it has been found that when made by a molding process, a two-stage molding process lends itself to the production of the present conductivity cells. Thus, referring to FIG. 2, it will be seen that the central portion 11*a* of the body 11 is first molded, this portion including the conductors 13 and 14 embedded therein and extending substantially the length of the portion 11*a* to impart added strength thereto. In the measuring section of the cell it will be seen that there are provided the sets of helically disposed notches 21*g* and 22*g* for predetermining the helical position of the two electrodes 21 and 22 of FIGS. 1 and 4. These notches, in helical paths, may be cut or molded in the ribs 23 between the flutes 24. For the cell having a constant of 0.01 reciprocal centimeter, the notches 21*g* and 22*g* are preferably of a diameter less than that of the circular wire-electrode. In this manner, the electrodes contact the edges of the notches but without filling them. This feature has an advantage in ease of cleaning the cell. For the cell having the constant of 0.002 the strip of platinum or platinum coated strip is wound into the notches in edgewise fashion, the notches being about 0.001 inch wider than the thickness of the rolled strip. The use of flattened wire enables a lower cell constant value to be achieved in the same overall cell body lengths by providing a greater effective interelectrode area and by reducing the longitudinal distance occupied by the electrode material.

It will be observed that at the upper and lower extremities of the measuring section there are provided pairs of openings extending through opposing ribs. These openings are to receive the respective ends of electrodes 21 and 22. Thus, as shown in FIG. 5, after the ends of each electrode have been pushed through their respective openings they are swaged, enlarged, or otherwise bent, as shown at 21*a* and 22*a* of FIG. 5, to prevent withdrawal through the openings. The two electrodes 21 and 22 are then wound in bifilar fashion under controlled tension and in manner illustrated in FIG. 4. At the upper end of the measuring section the electrodes 21 and 22 are threaded through the openings in the ribs 23 and pulled taut toward the conductors 13 and 14. Thus the upper end of electrode 21 lies against the outer surface of the body 11*a* and terminates in a few turns taken about the conductor 13. Similarly, the electrode 22 has a plurality of turns wound around conductor 14. It is preferred that the electrodes 21 and 22 be respectively fastened, as by welding, soldering or brazing, to the conductors 13 and 14 to provide low resistance connections thereto. The winding of the helical electrodes 21 and 22 may be from top to bottom instead of from the bottom to the top of core member 11*a*.

Figure 4:
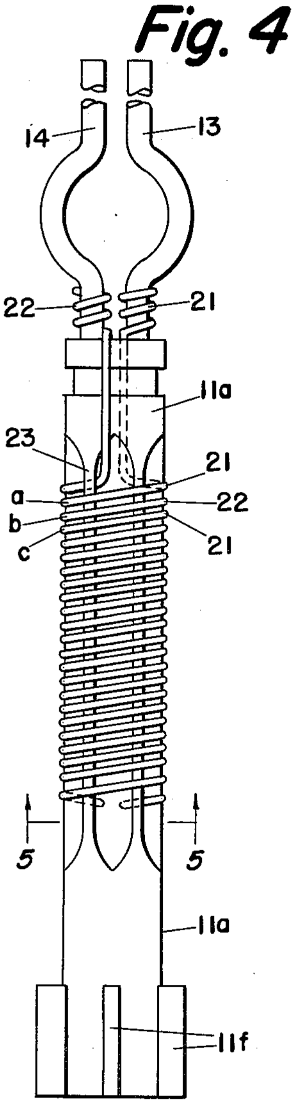
FIG. 4 is a plan view of the molded part of FIG. 2 after application thereto of the conductivity electrodes.
Figure 3:
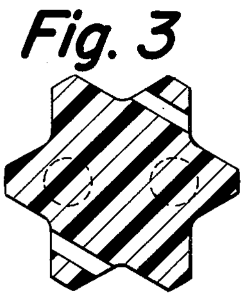
FIG. 3 is a sectional view taken on the line 3—3 of FIG. 2.
Figure 5:
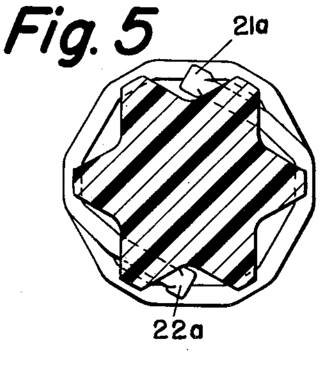
FIG. 5 is a sectional view taken on the line 5—5 of FIG. 4.

The assembly of FIG. 4 is now placed in a mold and the upper portion of the body 11 is formed, thereby to embed therein the points of connection between the electrodes and the conductors 13 and 14 and to form the threaded hub portions utilized for the protective housing 19 and for a cap 25. An O-ring provides a liquid seal for the cap.

Conductivity cells embodying the present invention are particularly suited to determination of the conductivity of high-resistance liquids such as distilled water. The molded parts of the cell are preferably made of a dimensionally stable, chemically inert, electrical insulating material, such as the synthetic resin trifluorochloroethylene available on the market under the trademark "Kel–F," though it is to be understood that other synthetic resins may be utilized. Either a "Teflon" resin or a "Kel–F" resin is preferred because they lend themselves to molding or sintering operations by means of which the conductors may be readily embedded therein as above described.

In summary, the body portions 11 and 11*a* are made of a material which will retain its good electrical insulating properties under all conditions of use and which may be readily cleaned and made free of any coating or deposit of electrically conducting materials in the region of the electrodes. The materials and construction are such that when the electrodes are not immersed in a solution for measurement an open circuit condition exists between the electrodes. The materials used are chosen to avoid any electrical path across the electrodes not associated with the sample substance. Also the construction is such that the conductive sample material can be readily purged upon removal of the cell from the sample solution.

Figures 6, 7:
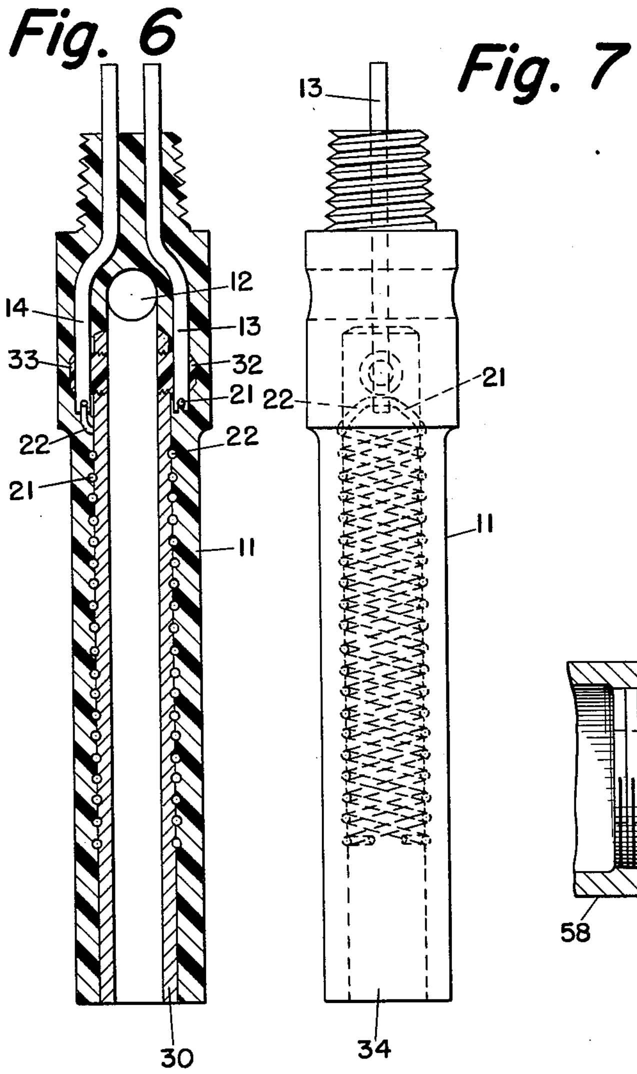
FIG. 6 is a sectional view of a modification of the invention wherein the finished cell has the electrodes supported on the inside surface of a tube prior to removal of a mandrel supporting the electrodes during molding.
FIG. 7 is a plan view of the modified form of the invention shown in FIG. 6.

Conductivity cells having the helically disposed electrodes may be produced in other ways. Body parts may be machined or molded, another molded form of which will be explained in connection with FIGS. 6 and 7. Referring first to FIG. 6, a metal tube 30, which may be of aluminum, is provided with helically disposed grooves within which there are wound the electrodes 21 and 22. The lower ends of the electrodes are punched into the grooves, thereby to lock them in fixed position. The upper ends of the electrodes are fastened to conductors 13 and 14. The conductors 13 and 14 are supported in fixed position by means of a pair of inserts 32 and 33 made of insulating material and threaded into openings in the tube 30. The assembly is then placed in the mold, and the body portion 11 formed of insulating material such as "Kel–F." The metal tube 30 is then chemically removed, as by immersion in a suitable acid. The end result is that the helically disposed electrodes 21 and 22 will throughout partial circumferences thereof be exposed to the liquid within the longitudinal passage 34 extending through the body 11. In this modification the body portion 11 itself performs the functions of the housing 19. In this connection, it will be noted that the longitudinal passage 34 is in flow communication with the transverse passage 12 extending through body 11.

Figure 8:
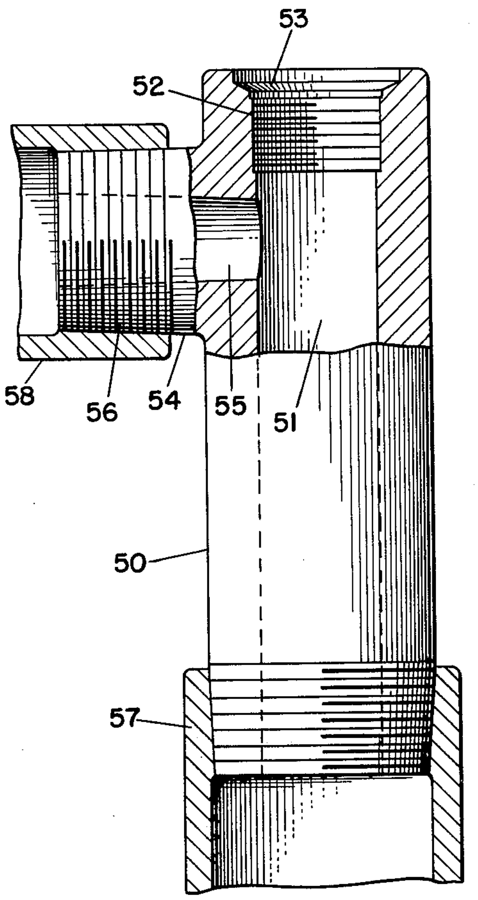
FIG. 8 is an elevation of a flow channel housing for the cell of FIG. 1.

A further advatnage of the FIG. 1 modification of the conductivity cell of the present invention is that the cell constant remains at its predetermined value whether the cell be used as a dip cell with the protective housing 19 of FIG. 1, or whether it be used for the measurement of conductivity of liquids flowing through pipes. This result is achieved by replacing the housing 19 with the flow channel housing 50 of FIG. 8. This housing has a longitudinal passage 51 of diameter equal to that of the passage through housing 19 of FIG. 1. The upper threaded end 52 is internally threaded and has a tapered seat 53 to receive a gasket or washer to form with the shoulder 11*e* of the body 11, FIG. 1, a fluid-tight seal. The housing 50 has a branch 54 with an internal flow connection 55 intersecting the passage 51. Branch 54 is externally threaded as at 56. Flow channel housing 50 may directly form a part of the piping through which liquid circulates, fractional portions 57 and 58 of such piping being illustrated. It is emphasized that the housing 50 may be utilized in the absence of piping 57 and 58, the cell then being useful as a dip cell, as in the case of FIG. 1. Whether the housing 19 of FIG. 1 be utilized or whether the flow channel housing 50 be utilized, the cell constant remains the same because each part is made of electrical insulating material and is internally dimensioned to have the same effect on the cross-sectional area of the fluid path. In this manner, there has been avoided the need of providing about the electrodes 21 and 22, FIG. 1, the same housing heretofore always necessary to assure constancy of the cell constant when used as a dip cell and when used for measurement of conductivity of liquids circulating in a system of piping. It has heretofore been necessary to retain the inner shell and to enclose that inner shell and the electrodes with an outer enclosing housing.

It is also to be noted that the cell of FIGS. 6–7 and the cell of FIG. 1 with the flow channel housing 50 in place of housing 19 can be used in conjunction with the forced circulation system described in our parent case.

While it will normally be preferred to operate the cell of FIG. 1 as shown, we nevertheless have found that useful conductivity measurements can be made with the housing member 19 removed. With electrode structures having the helical configuration of our invention it has been found that with an increase in the spacing between the housing and the electrodes the utility of the housing in precisely establishing the cell constant value rapidly decreases. The critical region extends radially from the electrodes a distance of approximately one-quarter inch. For distances greater than this the cell constant value for all practical purposes is independent of the existence of the housing. Accordingly the housing may be omitted providing care is exercised to avoid the intrusion of anything other than the sample solution into the critical region adjacent the electrodes. Furthermore due care must be exercised to avoid damage to the electrodes. Omitting the housing in the cell shown decreases the cell constant value by an amount somewhat less than one percent.

While a preferred embodiment of the invention has been illustrated, it is to be understood modifications may be made within the scope of the appended claims.

What is claimed is:

1. A conductivity cell comprising a pair of measuring electrodes insulated one from the other and rigidly mounted respectively in helical paths interleaved with precise spacing one from the other throughout their lengths, insulating means of a material inert to the sample solution whose conductivity is to be measured forming a support for said electrodes to maintain them in said precisely spaced helical relationship, an enclosure surrounding said electrodes for establishing about them a predetermined volume of said sample solution, said enclosure having access means for the filling of said enclosure with said sample solution, and means for connecting an electrical measuring circuit to said electrodes for the measurement of the conductivity of said sample solution within which said electrodes may be immersed.

2. The conductivity cell of claim 1 in which said enclosure forms said insulating means for supporting individual turns of said helically mounted electrodes in said precisely spaced relationship.

3. The conductivity cell of claim 1 in which one pair of corresponding ends of said electrodes extend in spaced relation from each other and lengthwise of the electrodes away from their helical array and into electrical connection with said connecting means, said insulating means having provisions for mechanically supporting the other pair of corresponding ends of said electrodes in spaced relation one with the other.

4. The conductivity cell of claim 1 in which said insulating means includes provisions for supporting corresponding ends of said electrodes in spaced relation one from the other.

5. The conductivity cell of claim 1 including a housing mechanically carried by said insulating means and having a longitudinal passage of greater diameter than the maximum dimension across said electrodes and of length for disposition therein of said electrodes in a position intermediate its ends, said housing having openings for entry therein of the solution under measurement.

6. The conductivity cell of claim 5 in which at least one of said openings is located near the end from which it is supported by said insulating means.

7. The conductivity cell of claim 6 in which there are provided pipe connections for flow of liquid through said cell.

8. A conductivity cell comprising a pair of measuring electrodes insulated one from the other and disposed respectively in helical paths interleaved one with the other throughout their lengths, insulating means of material inert to the solution under measurement and including a plurality of ribs and intervening flutes, said ribs having at least two sets of helically disposed recesses within which said electrodes are in part disposed to maintain them in said parallel helical paths, an enclosure surrounding said electrodes for establishing about them a predetermined volume of said sample solution, said enclosure having access means for the filling of said enclosure with said sample solution, and means for connecting an electrical measuring circuit to said electrodes for the measurement of the conductivity of said sample solutions within which said electrodes may be immersed.

9. The conductivity cell of claim 8 in which said electrodes have one pair of corresponding ends threaded through openings in said ribs, each end of the other pair of corresponding ends of said electrodes being respectively connected to terminal elements.

10. The combination of claim 9 in which said ends of said electrodes threaded through said openings have a shape which prevents withdrawal through said openings.

11. The conductivity cell of claim 8 in which said supporting means has a threaded hub, and a protective housing open at one end and threaded to said hub at its opposite end, said housing having an internal diameter greater than the outside diameter of said parallel helical paths of said electrodes.

12. The conductivity cell of claim 2 in which said electrodes comprise flat strips supported in said helical paths with the flat sides of said conductors in opposed relation one to the other.

13. A conductivity cell having a cell constant of a low order of magnitude comprising a support of dimensionally stable, chemically inert, electrical insulating material including alternately disposed ribs and flutes, a plurality of small notches in said ribs defining precisely spaced parallel helical paths about said axis, and at least a pair of electrical conducting elements wound on said support, each said element having a cross-sectional dimension of sufficient magnitude relative to said notches to prevent bottoming of said elements in said notches, said flutes and the open areas within said notches and under said elements providing for intimate contact with the liquid in which said support may be immersed for conductivity measurement of said liquid.

14. A conductivity cell having a cell constant of fixed magnitude expressed in terms of reciprocal centimeters comprising a tubular support of dimensionally stable, chemically inert, electrical insulating material, a pair of electrically conducting electrodes interleaved one with the other and fixedly disposed within and maintained by said support in parallel spiral paths precisely spaced apart one from the other, connector means for connecting said electrodes in a measuring circuit, and openings in said tubular support for ingress and egress of fluid the conductivity of which is to be measured.

15. The conductivity cell of claim 14 in which said spaced electrodes are in their entirety located between and in spaced relation with said openings.

16. The conductivity cell of claim 14 in which said conducting electrodes are throughout said spiral paths partially embedded in said insulating material.

17. The conductivity cell of claim 14 wherein said tubular support has a transverse passage and a longitudinal passage extending from fluid connection with said transverse passage to the distal end of said tubular support, and in which said electrodes are partially embedded in said body and have throughout their spiral paths equal surface areas exposed to liquid within said longitudinal passage.

18. A conductivity cell having a predetermined cell constant comprising electrode structure, a support for said electrode structure of dimensionally stable, chemically inert, electrical insulating material, lead structure within said support and accessible from one end of said support and within said support connected to said electrode structure, cap means detachably coupled to said end of said support and providing access to said lead structure, and a flow chamber of dimensionally stable, chemically inert, electrical insulating material having an elongated cylindrical section surrounding said electrode structure, said flow chamber including passages for the ingress and egress of fluid and at one end of said cylindrical section having an internal surface portion for detachable coupling engagement with said support between said electrode structure and said cap means, the inside diameter of said cylindrical section in cooperation with said electrode structure defining the effective area and length of the conducting path of said electrode structure, thereby to establish the cell constant of said cell.

19. The conductivity cell of claim 18 in which said flow chamber at said passages for the ingress and egress of fluid includes second and third coupling portions for connecting said flow chamber into a flow line.

20. A conductivity cell having a cell constant of a low order of magnitude comprising a pair of measuring electrodes disposed respectively in substantially helical paths of the same pitch diameter and interleaved throughout their lengths in precisely spaced relation one with the other for establishing opposed surfaces of said electrodes coextensive with their helical paths to receive therebetween a sample solution whose conductivity is to be measured, insulating means of a material inert to said sample solution and including means forming a support for said electrodes and having structure rigidly engaging individual turns of said electrodes to maintain them in said precise parallel helical relationship, and means for connecting an electrical measuring circuit to said electrodes for measurement of the conductivity of solutions within which said helical electrodes may be immersed.

21. The conductivity cell of claim 20 in which there is provided an enclosure of electrical insulating material inert to said sample solution surrounding and spaced from said electrodes for establishing around said electrodes a predetermined volume of solution to be measured.

References Cited in the file of this patent

UNITED STATES PATENTS

| | | |
|---|---|---|
| 2,122,363 | Christie | June 28, 1938 |
| 2,717,957 | Ohlheiser | Sept. 13, 1955 |
| 2,769,140 | Obenshain | Oct. 30, 1956 |
| 2,830,945 | Keidel | Apr. 15, 1958 |

FOREIGN PATENTS

| | | |
|---|---|---|
| 744,707 | Germany | June 8, 1944 |